Jan. 14, 1958     T. E. DADSON     2,820,130
RANGE
Filed April 8, 1955
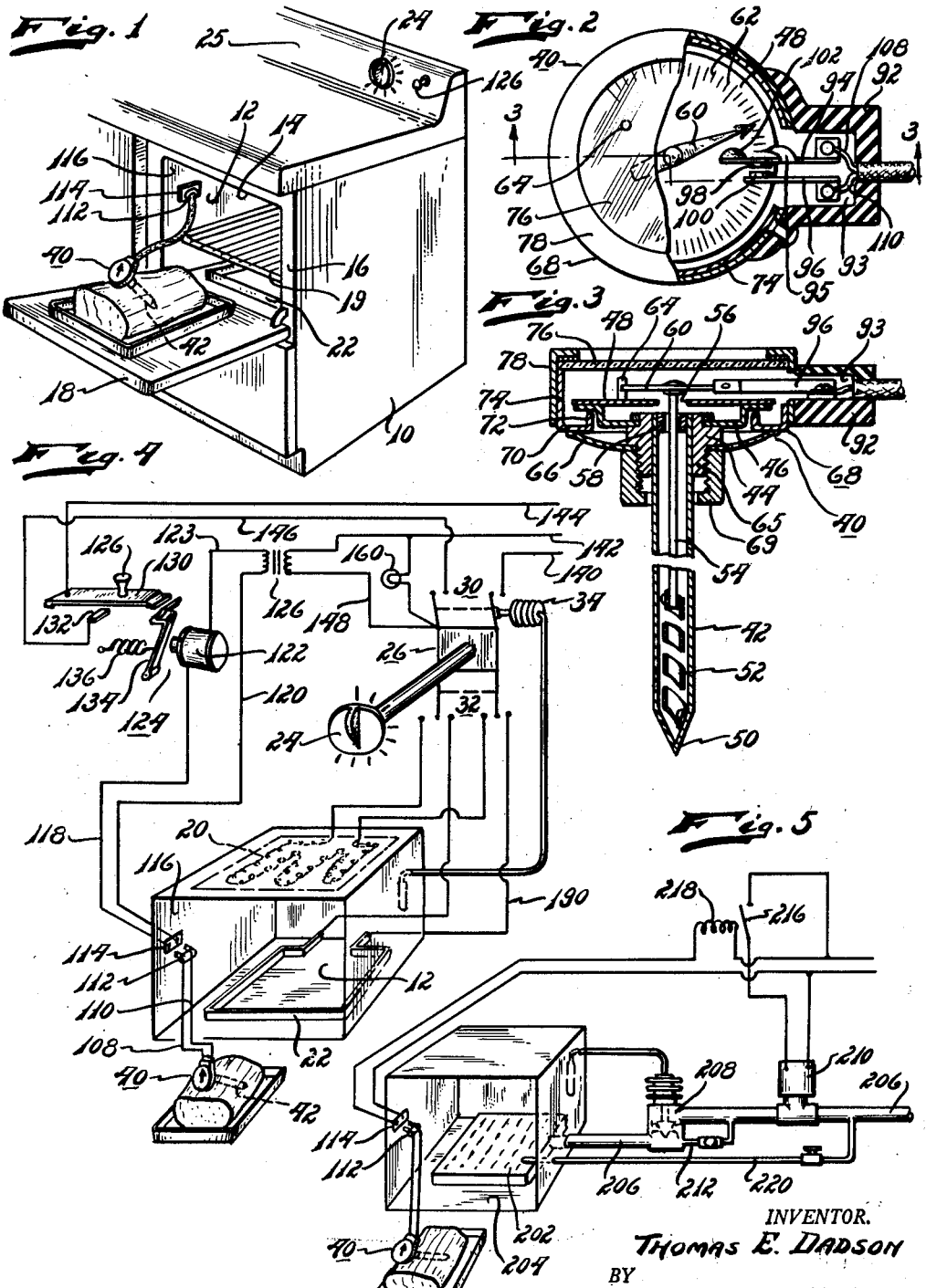
INVENTOR.
THOMAS E. DADSON
BY
Ralph E. Baker
ATTORNEY

United States Patent Office 2,820,130
Patented Jan. 14, 1958

2,820,130

RANGE

Thomas E. Dadson, Franklin, Mich., assignor to American Motors Corporation, Detroit, Mich., a corporation of Maryland Application April 8, 1955, Serial No. 500,202

3 Claims. (Cl. 219—20)

This invention relates to ranges and more particularly to an improved arrangement for controlling the oven temperature.

It is an object of the present invention to provide in a range an improved arrangement for controlling the oven temperature whereby the heating is thermostatically controlled to maintain a pre-selected temperature of the air and automatically stopped in response to the temperature of the food being prepared in the oven.

It is another object of the present invention to provide for an oven having provisions for heating the air circulating therein an improved arrangement for two thermostatic controls whereby one is responsive to the temperature of the air within the oven, and the other is responsive to the temperature of the food placed and being cooked within the oven, the latter thermostatic control being operable to prevent further heating when the desired degree of doneness of the food has been attained.

Another object of the present invention is to provide in an oven having heating elements, a thermostatic control adapted to penetrate into the body of the food being prepared within the oven and be responsive to the internal temperature of the food for turning off the heating means when the food has attained a desired degree of doneness, the thermostatic control having a manual adjustment arrangement to modify the response of the thermostatic control.

Further objects and advantages of the present invention will be apparent from the following description, reference being had to the accompanying drawing, wherein a preferred form of the present invention is clearly shown.

In the drawings:

Fig. 1 is a fragmentary perspective view of a range embodying the invention;

Fig. 2 is a top plan view of a thermostatic control embodying features of my invention with parts broken away and parts shown in section;

Fig. 3 is a view in cross section taken along the line 3—3 of Fig. 2;

Fig. 4 is a diagrammatic illustration of arrangement of controls and wiring diagram embodying features of my invention, and Fig. 5 is a diagrammatic illustration of a modified control arrangement embodying features of my invention.

Referring to the drawing there is shown a range 10 having an oven or oven chamber 12. Access to the oven chamber is provided through opening 14 formed in a front wall 16 of the range. The opening 14 is closed by a swingably mounted door 18. Suitable shelf or shelves 19 may be provided and suitably supported within the oven chamber 12.

Mounted within the oven chamber 12 are electrical heating elements 20 and 22. The heating element 20 is suitably mounted in the upper portion of the chamber, preferably adjacent to the top wall, and is particularly adapted for use in broiling articles of food placed in close proximity directly beneath the heating element. The heating element 20 may also be used in combination with the heating element 22 for a fast pre-heating of the oven chamber. The heating element 22 is suitably mounted adjacent the lower portion of the chamber, preferably adjacent the bottom wall, and is particularly adapted for use in heating the air circulating within the oven chamber when the chamber is in general use as for baking, roasting and similar cooking operation.

The heating elements 20 and 22 are manually placed in operation by turning of a knob 24 mounted on a top surface 25 of the range 10. The knob 24 is connected to operate a control, diagrammatically shown and indicated in general by numeral 26 in Fig. 4, which combines in general switches 30, 32 and a thermostatic control mechanism 34 associated with the switch 30. The switch 30 is actuated by the thermostatic control mechanism 34 and is associated with the switch 32 which is primarily a selective switch for closing a circuit with heating element 20 or 22 as desired. The arrangement is such that the turning of the knob 24 actuates the switches to selectively close an electrical circuit to heating elements 20 or 22 as desired, and if the heating element 22 is selected the thermostatic control is also simultaneously adjusted (not shown) to function with the switch 30 for making and breaking the electric circuit to the heating element to maintain the oven at a uniform pre-selected temperature during the period of its use, the selected temperature corresponding to the rotational setting of the knob 24 by the user. The control 26 is not detailed in construction as such controls are well known in the art and any of the well known types briefly described above may be used with the present invention.

The control 26 described above operates to maintain the oven at a uniform selected temperature as long as the user desires, but it is for the used to decide the length of time necessary for the preparation of food placed within the oven, and the proper moment to turn off the heating element when the food has been cooked to the proper degree of doneness. To eliminate this guess work there is provided a thermostatic control 40 which may be affixed in thermal heat exchange relation to an article of food to be prepared. The control 40 will be responsive to the internal temperature of the food being prepared or cooked to actuate and turn off the heating element 22 by breaking the circuit to the control 26 into which it may be readily attached or detached as desired.

The thermostatic control 40 is provided with a skewer type pointed tubular member 42 adapted to pierce and enter into a body of an article of food. Fixedly secured adjacent the upper end of the tubular member 42 is a hub 44 upon which is centered and fixedly secured a disc 46 which carries a dial plate 48. The lower end of the tubular member 42 is provided with a closed pointed end 50, and expandable within the tubular member is a bi-metallic helically wound coil 52. One end of the coil 52 is secured substantially in close proximity to the point 50 and the other end to rod 54. The rod 54 extends axially upwardly within the tubular member and through an aperture 56 formed in the dial plate 48. The rod 54 is journaled in a bearing 58. Secured on the upper end of the rod is a pointer 60 adapted to rotate with the rod and register with suitable markings 62 provided on the face of the dial plate 48. A stop 64 may be provided which extends upwardly from the face of dial plate 48 to limit the movement of the pointer 60 in one direction.

The hub 44 is formed with a reduced threaded shank 65 upon which is centered a resilient disc 66 locked to the hub 44 by a nut 69 threaded on the shank 66. Supported on the peripheral edge of the resilient disc is a housing and contact carrying assembly 68. The assembly 68 rests on the disc and is rotatably moveable thereon concentric to the axis of the rod 54. The assembly 68 comprises an annular ring 70 formed with upwardly extending spaced concentric walls 72 and 74. The inner concentric wall 72 abuts against the underside of the disc 46, the outer concentric wall 74 extends above the pointer and dial plate to support a lens 76. The lens 76 is secured by ring 78 that is secured to wall 74. The block member 92 is preferably formed of electrical insulation material. Secured to the member 92 within a chamber 93 formed therein are a pair of contact arms 94 and 96 in spaced apart relation and which extend out over the dial plate 48. Each of the arms 94 and 96 are provided with an electrical contact point 98 and 100 respectively and are aligned in opposed relation to each other. The arm 96 is formed to be rigid, while the arm 94 is formed of resilient material and provided adjacent its end with an insulated button 102 adapted to be engaged by the pointer 60 for flexing or moving the arm 94 towards the arm 96 until the contacts 98 and 100 are in engagement. Each of the arms 94 and 96 are electrical conductors and are connected by electrical conductors or wires 108 and 110 whose opposite ends are affixed in a terminal plug 112 which is adapted to enter and form an electrical connection within a receptacle 114 preferably carried on a side wall 116 of the oven chamber. The receptacle 114 is connected by wires 118 and 120, the wire 118 being connected to an electro-magnetic coil 122 which in turn is connected by wire 123 which together with wire 120 are connected to the low voltage side of a transformer 126, thereby forming a closed electrical circuit for the thermostatic control 40.

The electro-magnetic coil 122 forms a part of a switch mechanism, shown in general by the number 124, that is manually set by a button 126 preferably located on the top surface 25 of the range 10 adjacent to or in close proximity to the knob 24. The switch mechanism 124 is shown diagrammatically in Fig. 4 as comprising a resilient switch arm 130 carrying the button 126 which when pressed downwardly will flex or move the switch arm 130 into contact engagement with contact 132. A latch 134 is moved by resilient spring 136 into engagement with the switch arm 130 to lock the arm in contact engagement with the contact point 132. The latch 134 is magnetically responsive to the coil 122 which when energized will attract the latch causing it to move against the tension of the spring 136 to release the switch arm which will move or flex away from the contact point 132, that is the switch 124 is moved to open position. However, it will be obvious that other switch devices may be used than that described above that may be manually moved to closed position and automatically moved to open position.

The switch 124 is electrically wired in series with the switch section 30 of the control 26. Three lines or wires 140, 142, 144 are shown leading from a suitable supply source of electrical energy. The line 140 is connected to a contact in switch section 30, the other contact is connected by wire or line 146 to the contact point 132 of the switch 124, the switch arm 130 is connected by line 144 forming a circuit for the switch 124 through the control 24. The line 142 connects to the high voltage side of the transformer 126 which is connected by line 148 to the switch section 30 so that when the switch 30 is operated to closed or on position the transformer will be energized.

In operation the user, prior to placing the article of food on the shelf 20 within the oven chamber 12, will first affix the thermostatic control 40 to the article of food to be cooked by inserting the tubular member 42 into the body of the food. Preferably the tubular member 42 should be embedded substantially its entire length, or at least completely to a depth of the bi-metallic coil 52, so that the mass of the food serves to insulate and prevent the coil 52 from being influenced by the heat of the oven, and be solely responsive to the internal temperature of the food. As various foods are cooked at different heat or temperature requirements thereby attaining different internal temperatures when cooked to a desired degree of doneness, and as some foods also may be cooked to different degree of doneness to satisfy palatable wishes, such as well done, rare or medium, the thermostat control may be adjusted to such needs. By rotating the housing assembly 68 the contact arms 94 and 96 are carried about the dial face until the proper setting is reached, the setting being in alignment of pointer 95, carried by arm 94, with a dial marking provided in dial plate 48. If desired a marking may be carried on the housing (not shown) to register with the dial markings on the dial plate. The dial setting will be maintained as the resilient disc 66 tends to press the housing upwardly so that the top edge of the inner wall 72 is in frictional engagement with the stationary disc 46 to prevent free or undue movement of the housing. The article of food is placed within the oven, and the terminal plug 112 inserted into the receptacle 114. The knob 24 is rotated to a desired temperature setting which will both close the circuit to the heating element 22 and also adjust the thermostatic control 34 to maintain the oven at a uniform selected temperature, and the button 126 is pressed to place the switch 124 in closed or on position.

When the food has attained the proper or desired degree of doneness the pointer 60 will have rotated to engage and move the contact arm 94 so that the contacts 98 and 100 are moved together to close a circuit energizing the coil 122. The coil 122 will actuate latch 134 against tension of the spring 136 to release the switch arm 130 effecting a disengagement from contact 132 breaking the electrical circuit to the control mechanism 26 and de-energizing the heating element 22 preventing further heating of the oven. A signal light 160 (see Fig. 4) may be provided to automatically light when the cooking operation is started, and automatically turn off when the operation is completed.

It will be noted that there is provided a control arrangement whereby the heating elements are manually turned on, automatically maintained to provide a uniform selected temperature within an oven chamber, and automatically turned off in response to the temperature of the food being cooked. The arrangement being one whereby the food may be cooked to any degree of doneness desired. Further the arrangement is such that the user may have use of the oven without the thermostatic control 40, which may be unplugged and removed from the circuit, and pressing button 126 to close the switch 124 which will remain in closed or on position once set until the thermostatic control 40 is placed back into the circuit to energize the coil 122.

Though the above arrangement describes and illustrates the switch 124 as connected in a circuit for controlling the flow of electrical current through the oven thermostatic control switch to the heating element, it will be obvious that the same results are obtained were the switch 124 be connected in the line 190 between the oven thermostatic control switch and the heating element 22 for directly controlling the flow of current to the heating element 22. In either arrangement the heating element 22 may be rendered inoperative by the thermostatic control 40.

In Fig. 5 there is shown diagrammatically a modified arrangement of the present invention adapted for use in ranges having a flame type burner 202 using vapor or liquid fuel to heat the oven chamber 204. A conduit 206 is connected to conduct fuel to the burner 202 and interposed in the conduit for controlling the flow of fuel is a thermostatically controlled valve 208 and a solenoid shut-off valve 210. The thermostatically controlled valve 208 is responsive to the temperature within the oven to actuate the valve 208 to a fully open position which provides the burner with a high flame, and the burner is provided with a low flame through a by-pass conduit 212 which meters a minimum flow of fuel to the burner when the valve 208 is fully closed.

The solenoid shut-off valve 210 is controlled through a switch 216 which may be manually moved to closed position and moved to open position by an electromagnetic coil 218 similar to switch control 124 described in the preferred form. The coil 218 is energized through the action of thermostatic control 40 which is responsive to the internal tempertaure of the food being prepared within the oven chamber 204.

In operation the control 40 is inserted into the food and adjusted to a desired setting as described in the preferred form. The switch 216 is manually moved to a closed position to energize the solenoid shut-off valve 208 to actuate it to open position permitting the flow of fuel to the burner. A conduit 220 provides a constant flow of fuel to provide a pilot light to ignite the fuel at the burner. When the food has been properly cooked, the contacts in the thermostatic control 40 will be moved to closed contact position, de-energizing and closing shut-off valve 210. The control 40 is, as described, normally in open contact position and is moved to closed contact position when the desired degree of doneness of the food has been attained causing an energizing of the coil 218 to actuate the switch 216 to open position and de-energizing the solenoid to actuate the shut-off valve to close position, preventing further flow of fuel to the burner and preventing further heating of the oven.

Although preferred and modified forms have been illustrated and described in detail, it will be apparent to those skilled in the art that various other modifications may be made therein without departing from the spirit of the invention or from the scope of the appended claims.

I claim:

1. An oven having in combination, an electrical heating element for the heating of the circulating air within said oven, a heat regulating and controlling device responsive to the temperature within said oven, said heat regulating and controlling device being connected in series circuit connection with said electrical heating element, a second heat controlling device arranged to be primarily responsive to the temperature of the food placed within said oven having a normally open switch and a heat responsive element for actuating said switch to closed position, means to vary the actuation of said switch by said heat responsive element, a second switch connected in series circuit connection with said electrical heating element, an elctro-magnetic means for operating said second switch to open position, and said electro-magnetic means being connected in series circuit connection with said first switch.

2. An oven having in combination, electrical heating elements for the heating of the circulating air within said oven, a heat regulating and controlling device responsive to the temperature within said oven for energizing and deenergizing said heating elements, a second heat controlling device arranged to be primarily responsive to the temperature of the food placed within said oven having a normally open switch and a heat responsive element for actuating said switch to closed position, means to vary the actuation of said switch by said heat responsive element, a second switch connected in series circuit connection with said heat regulating and controlling device, an electro-magnetic means for operating said second switch to open position, and said electro-magnetic means being connected in series circuit connection with said first switch.

3. An oven having in combination, electrical heating elements for the heating of the circulating air within said oven, heat regulating and controlling device responsive to the temperature within said oven for energizing and deenergizing said heating elements, a second heat controlling device arranged to be primarily responsive to the temperature of the food placed within said oven having a normally open switch and a heat responsive element for actuating said switch to closed position, means to vary the actuation of said switch by said heat responsive element, a second switch connected in series circuit connection with said heat regulating and controlling device, an electro-magnetic means for operating said second switch to open position, said electro-magnetic means being connected in series circuit connection with said first switch, and manual means for setting said switch to closed position.

References Cited in the file of this patent

UNITED STATES PATENTS

| | | |
|---|---|---|
| 2,004,977 | Chester et al. | June 18, 1935 |
| 2,103,513 | Campbell | Dec. 28, 1937 |
| 2,308,570 | Sherman | Jan. 19, 1943 |
| 2,434,467 | McCormick | Jan. 13, 1948 |
| 2,435,530 | Candor | Feb. 3, 1948 |
| 2,502,159 | Lamb et al. | Mar. 28, 1950 |
| 2,510,526 | Smith | June 6, 1950 |
| 2,664,489 | Dickey | Dec. 29, 1953 |
| 2,668,223 | McCormick | Feb. 2, 1954 |
| 2,724,029 | Barnes | Nov. 15, 1955 |
| 2,726,299 | Carlson | Dec. 6, 1955 |